(12) United States Patent
Marggi et al.

(10) Patent No.: US 8,646,967 B2
(45) Date of Patent: Feb. 11, 2014

(54) ENHANCED REEL FOR AGRICULTURAL MIXER

(75) Inventors: Jeff Marggi, Oregon, WI (US); Jacob Veeder, Browntown, WI (US); Jeremiah Kleiber, Darlington, WI (US); Claude McFarlane, Fitchburg, WI (US); Brian Green, Mercersburg, PA (US)

(73) Assignee: Kuhn North America, Inc., Brodhead, WI (US)

( * ) Notice: Subject to any disclaimer, the term of this patent is extended or adjusted under 35 U.S.C. 154(b) by 138 days.

(21) Appl. No.: 13/186,120

(22) Filed: Jul. 19, 2011

(65) Prior Publication Data

US 2012/0014208 A1    Jan. 19, 2012

Related U.S. Application Data

(60) Provisional application No. 61/365,699, filed on Jul. 19, 2010.

(51) Int. Cl.
*B01F 7/00* (2006.01)

(52) U.S. Cl.
USPC .......................................... 366/299; 366/318

(58) Field of Classification Search
USPC ............ 366/310, 311, 290, 325.94, 299, 318
See application file for complete search history.

(56) References Cited

U.S. PATENT DOCUMENTS

| | | | |
|---|---|---|---|
| 1,036,374 A * | 8/1912 | Temple | 366/310 |
| 2,146,776 A * | 2/1939 | Strominger | 366/170.3 |
| 2,243,317 A | 5/1941 | Phelan | |
| 2,810,557 A * | 10/1957 | Phelan | 366/311 |
| 2,847,197 A | 8/1958 | Thompson, Jr. | |
| 3,550,965 A * | 12/1970 | Reinecker et al. | 241/101.5 |
| 4,275,568 A * | 6/1981 | Zielsdorf | 366/147 |
| 4,506,990 A | 3/1985 | Neier et al. | |
| 4,597,672 A | 7/1986 | Neier et al. | |
| 4,660,987 A | 4/1987 | Robinson | |
| 4,707,140 A | 11/1987 | Mohrlang | |
| 4,741,625 A | 5/1988 | Neier | |

(Continued)

FOREIGN PATENT DOCUMENTS

WO    2010/029525    3/2010

OTHER PUBLICATIONS

International Search Report and Written Opinion issued Dec. 21, 2011, in PCT/US 11/44465.

(Continued)

*Primary Examiner* — Tony G Soohoo
*Assistant Examiner* — Anshu Bhatia
(74) *Attorney, Agent, or Firm* — Oblon, Spivak, McClelland, Maier & Neustadt, L.L.P.

(57) ABSTRACT

A mixing apparatus includes a hopper, a reel, and at least one auger. The hopper defines first and second chambers. The first chamber is disposed adjacent to the second chamber. The reel is disposed within the first chamber. The reel includes first and second hubs configured to rotate and at least one connecting member connecting the first hub to the second hub. The at least one auger is disposed in the second chamber. The first and second hubs rotate about a common axis of rotation. No connecting member connects a center of the first hub to a center of the second hub along the axis of rotation. An attachment point between each connecting member and the first hub is circumferentially offset with respect to an attachment point between the same connecting member and the second hub.

27 Claims, 17 Drawing Sheets

(56) References Cited

U.S. PATENT DOCUMENTS

| | | | |
|---|---|---|---|
| 4,756,626 | A | 7/1988 | Neier |
| 4,790,667 | A | 12/1988 | Pardo et al. |
| 4,799,800 | A | 1/1989 | Schuler |
| 4,896,970 | A | 1/1990 | Schuler |
| 5,143,310 | A | 9/1992 | Neier |
| 5,213,026 | A * | 5/1993 | House .......................... 366/319 |
| 6,752,530 | B2 | 6/2004 | Pecis |
| 7,329,040 | B2 | 2/2008 | Elrod |
| 7,566,166 | B2 | 7/2009 | Neier |
| 2005/0146983 | A1 | 7/2005 | Hermsmeyer et al. |
| 2006/0062078 | A1* | 3/2006 | Jejcic .......................... 366/310 |
| 2007/0297284 | A1* | 12/2007 | Neier et al. .................. 366/299 |
| 2009/0268549 | A1 | 10/2009 | Neier et al. |

OTHER PUBLICATIONS

S. Howes, Ribbon Blender, Horizontal Ribbon Blender, S. Howes, Inc., 25 Howard St. Silver Creek, NY 14136, 2 pp.

S. Howes, Established 1856, Horizontal Paddle Mixer, S. Howes, Inc., 25 Howard St. Silver Creek, NY 14136, 2 pp.

S. Howes, Established 1856, Heavy-Duty Horizontal Batch Mixer, S. Howes, Inc., 25 Howard St. Silver Creek, NY 14136, 2 pp.

S. Howes, Continuous Mixer (Pug Mill). S. Howes, Inc., 25 Howard St. Silver Creek, NY 14136, 2 pp.

Fritsch Equipment http://www.fritschequipment.com/rissler_electramix html, Jul. 14, 2010.

METKO 1560 Powerblend TMR Mixer, METKO, Inc., © 1992, 1251 Milwaukee Dr, New Holstein, WI 53061, 2 pp.

Rotary Mixer Ration Saver Oswalt's Rationsaver, Oswalt Bocats Product by Heyco, Inc., P.O. Box 1038, N. Hwy 83, Garden City, KS 67846, 2 pp.

Rotary Mixer Ration Saver Oswalt's Rationsaver, Oswalt Bocats Product by Heyco, Inc., P.O. Box 1038, N. Hwy 83, Garden City, KS 67846, 2pp.

Super Reel Mixer, Model SRM262, Schuler Mfg. & Equip. Co., Inc., Route 2, Box 68, Griswold, Iowa 51535, 2 pp.

Schuler, Schuler Mfg. Introduces Three New Model Multi-Screw Mixers ~ Models MS550—MS750—MS1050 Tractor or Truck Mount, Schuler Mfg. & Equip. Co., Inc., 2 pp.

H.C. Davis Sons Manufacturing Co., Inc., Batch Mixers, Ribbon Mixers & Paddle Mixers by H.C. Davis Sons Manufacturing Co., Inc., Standard Duty Page, http://www.hcdavis.com/commercial/standardduty.htm, May 28, 2010.

* cited by examiner

ENHANCED REEL FOR AGRICULTURAL MIXER

CROSS-REFERENCE TO RELATED APPLICATION

This document claims the benefit of U.S. Provisional Application No. 61/365,699, entitled "Enhanced Reel For Agricultural Mixer," filed Jul. 19, 2010, the entire contents of which are hereby incorporated by reference.

BACKGROUND OF THE INVENTION

1. Field of the Invention

This invention relates to a mixer using a reel and also to a particular reel configuration individually arranged with or without the mixer. One example of the mixer provides a mixing apparatus including two augers with axes offset from a reel axis.

2. Description of the Related Art

Industrial mixers, and in particular animal feed mixers, are commonly used in combination with one or more augers and/or reels. Such reels were typically arranged similar to riverboat paddle wheels with a center drive shaft and outer shafts or paddles disposed on the outer ends of spokes extending from the center drive shaft. For example, U.S. Pat. No. 7,566,166 to Neier et al. describes an animal feed mixer having staggered rotor paddles. The entire content of Neier et al. is incorporated herein by reference. Earlier devices include U.S. Pat. No. 4,506,990, U.S. Pat. No. 4,597,672, U.S. Pat. No. 4,741,625, U.S. Pat. No. 4,756,626, U.S. Pat. No. 4,799,800, U.S. Pat. No. 4,896,970, U.S. Pat. No. 5,143,310, U.S. Patent Application Publication No. 2009/0268549, and International Publication No. WO 2010/029525 A1, the content of each of which is incorporated by reference herein in its entirety.

SUMMARY OF THE INVENTION

The inventors recognized certain issues arisen with the above-noted related art machines. In particular, "pulsing" may occur when large chunks of feed are moved at one time via the reel toward the augers. Such pulsing may cause inaccuracy in scales used to weigh the apparatus and weigh the feed inside the apparatus to determine the amount of mix or feed initially within the apparatus and discharged from the apparatus during a given period of time inaccurate. In other words, the pulsing may cause fluctuations in the readings of the scales while the reel is rotating.

Additionally, as conventional devices typically required a centralized drive shaft connecting the ends or hubs of the reel, clogging or partial solidification of the mix disposed adjacent to the reel could occur. In other words, the mix located within the diameter of the reel could itself rotate as a solid "barrel-like" partially solidified structure. Thus, mixing efficiency could be reduced.

Accordingly, one aspect of the present invention provides a reel for a mixing apparatus in which no centralized drive shaft connects the ends, i.e., hubs or "stars" used to support the mixing bars of the reel.

Another aspect of the invention provides a helical structure to the bars used for mixing in the reel. The helical nature of the bars may reduce or eliminate the pulsing effect noted above. These aspects may be implemented separately or in combination with each other.

One aspect of the invention provides a mixing apparatus which includes a hopper, a reel, and at least one auger. The hopper defines first and second chambers. The first chamber is disposed adjacent to the second chamber. The reel is disposed within the first chamber. The reel includes first and second hubs configured to rotate and at least one connecting member connecting the first hub to the second hub. The at least one auger is disposed in the second chamber. The first and second hubs rotate about a common axis of rotation. No connecting member connects a center of the first hub to a center of the second hub along the axis of rotation. An attachment point between each connecting member and the first hub is circumferentially offset with respect to an attachment point between the same connecting member and the second hub.

Another aspect of the invention provides a mixing apparatus which includes a hopper, a reel, at least one primary member, at least one auger, and at least one secondary member. The hopper defines first and second chambers. The first chamber is disposed adjacent to the second chamber. The reel is disposed within the first chamber. The reel includes first and second hubs configured to rotate about a common axis of rotation. The at least one primary member connects the first hub to the second hub and is configured to sweep a cylindrical volume while the first and second hubs rotate. The at least one auger is disposed in the second chamber. The at least one secondary member is disposed at a non-zero angle relative to the axis of rotation of the first and second hubs such that the secondary member passes through the cylindrical volume while the first and second hubs rotate.

Another aspect of the invention provides a mixing apparatus which includes a hopper, a reel, at least one wiper, and at least one auger. The hopper defines first and second chambers. The first chamber is disposed adjacent to the second chamber. The reel is disposed within the first chamber. The reel includes first and second hubs configured to rotate and at least one connecting member connecting the first hub to the second hub. The first and second hubs are configured to rotate about a common axis of rotation, and no connecting member connects a center of the first hub to a center of the second hub along the axis of rotation. The at least one wiper is connected to the at least one connecting member. Each wiper is connected to only one connecting member. The at least one auger is disposed in the second chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
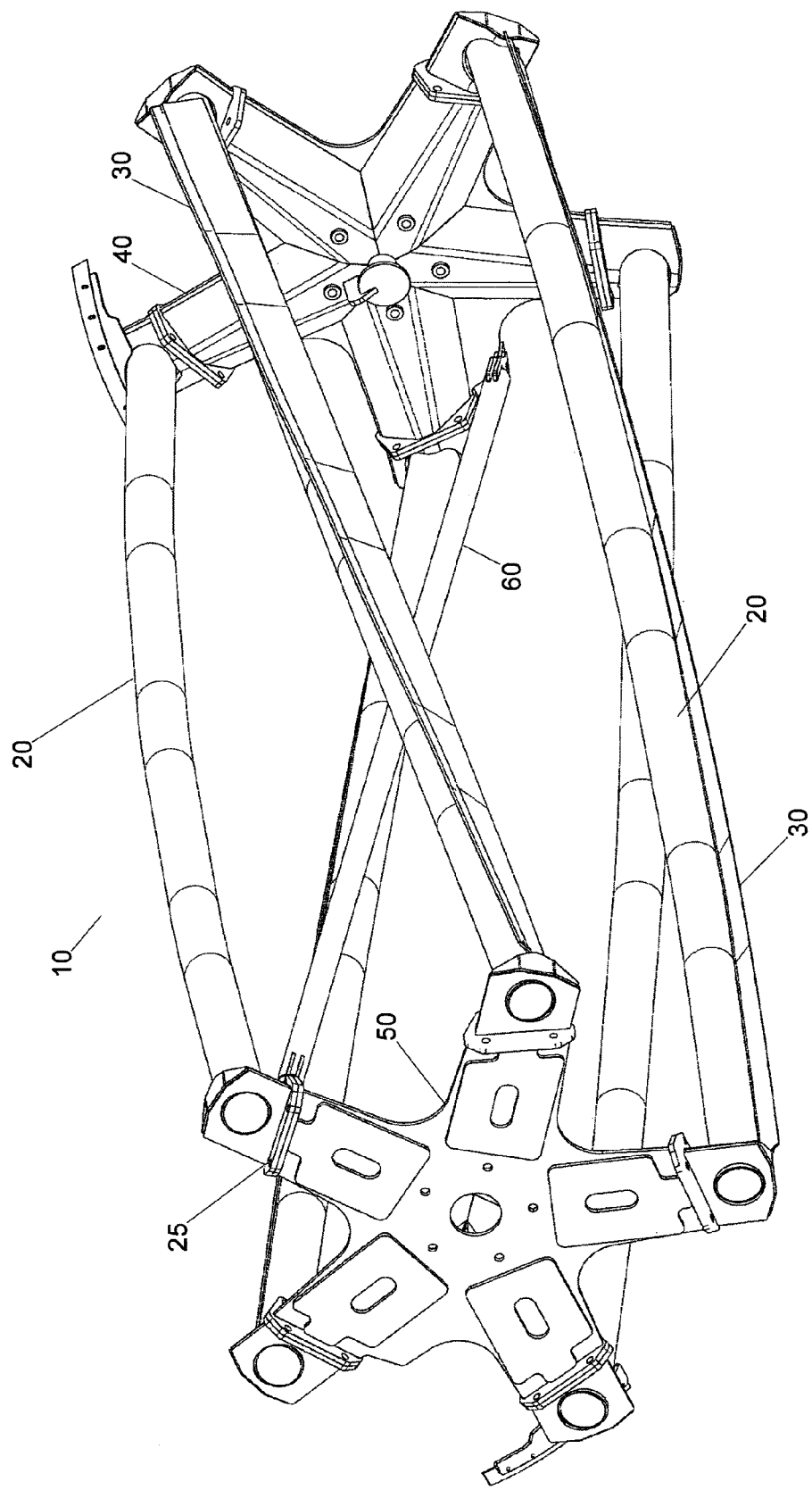
FIG. 1 is an isometric view of a reel according to one aspect of the invention.
Figure 2:
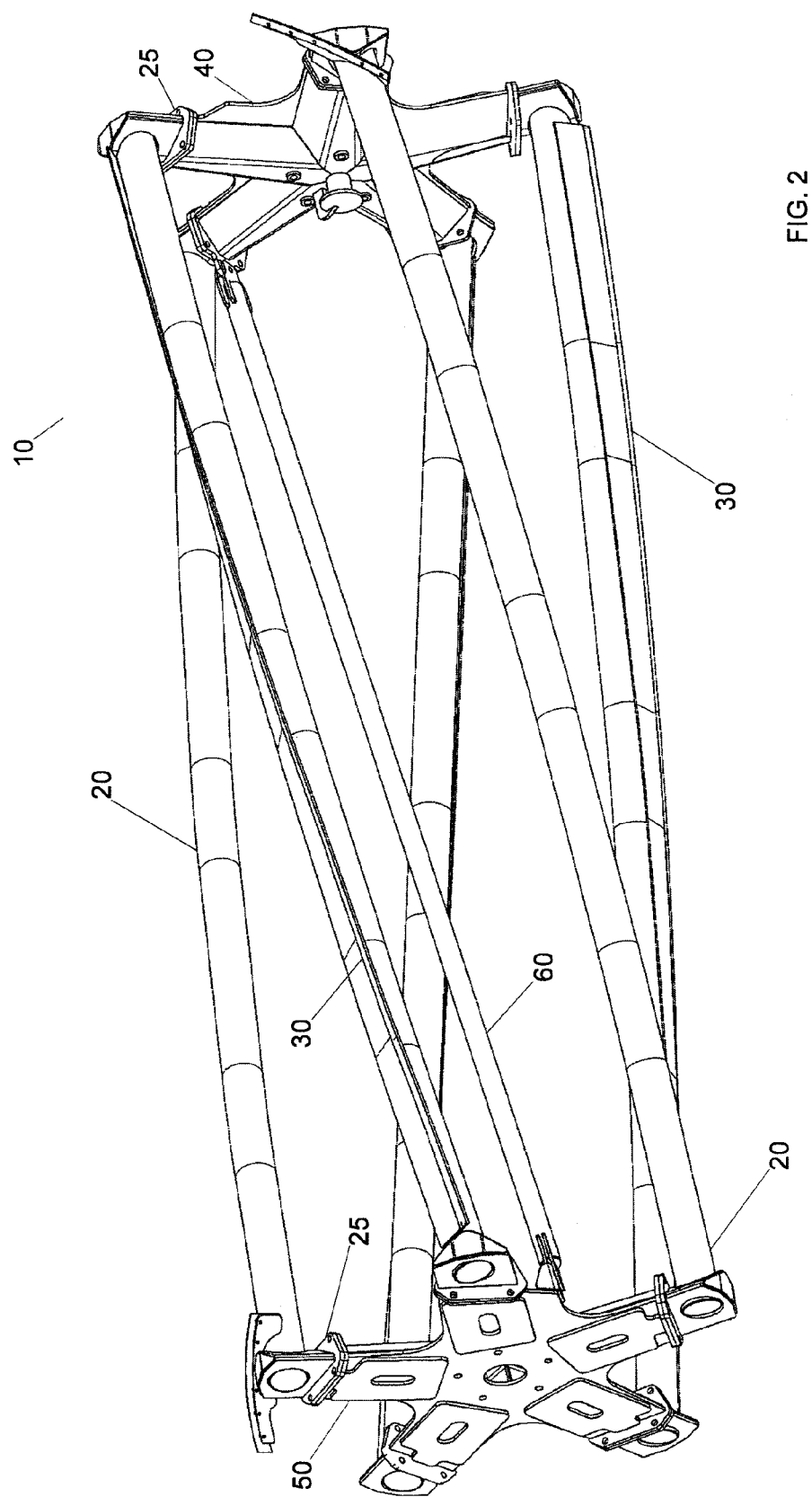
FIG. 2 is a second isometric view of the apparatus depicted in FIG. 1.
Figure 3:
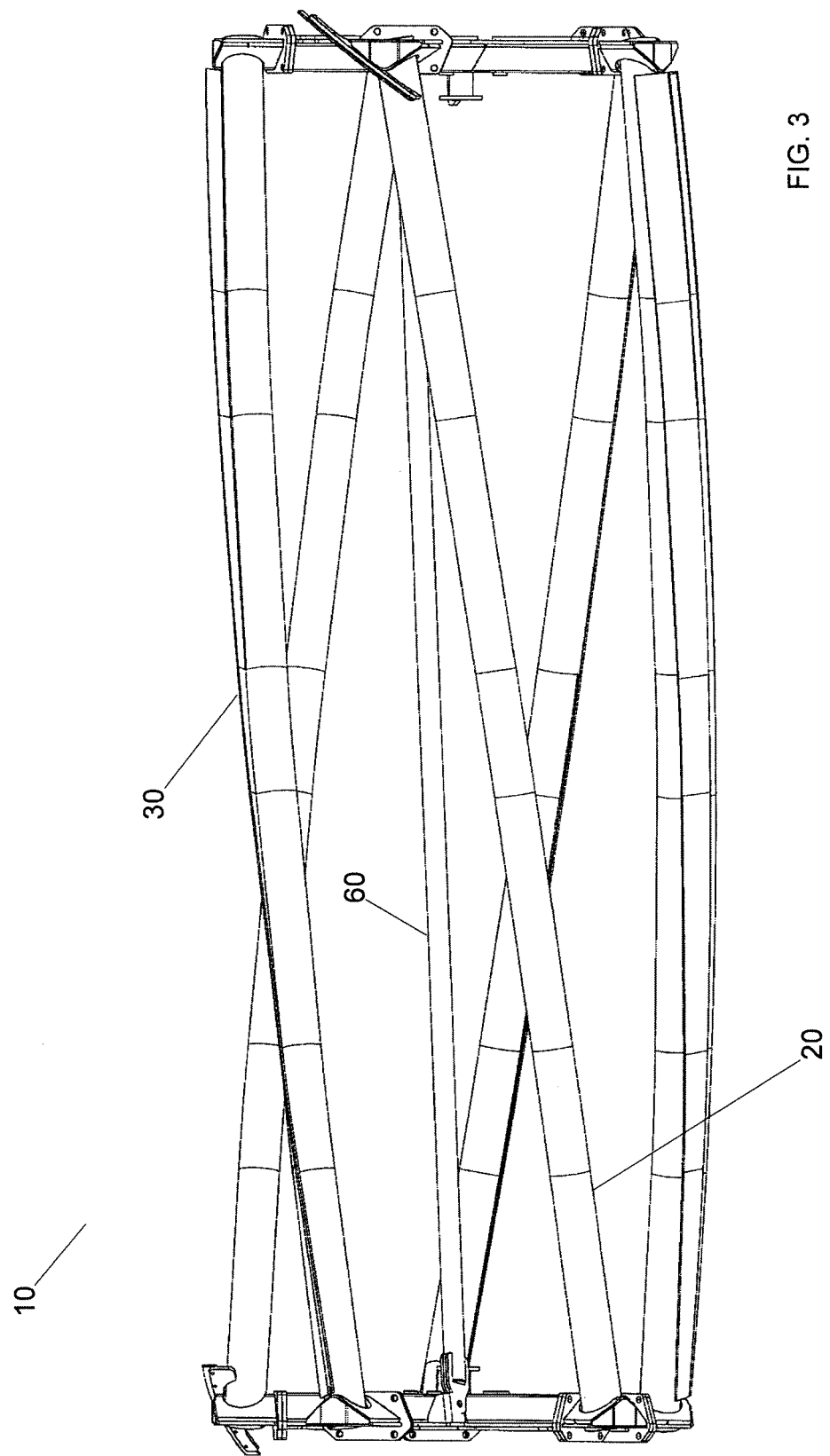
FIG. 3 is a side view, directly perpendicular to the axis of rotation of the reel depicted in FIG. 2.
Figure 4:
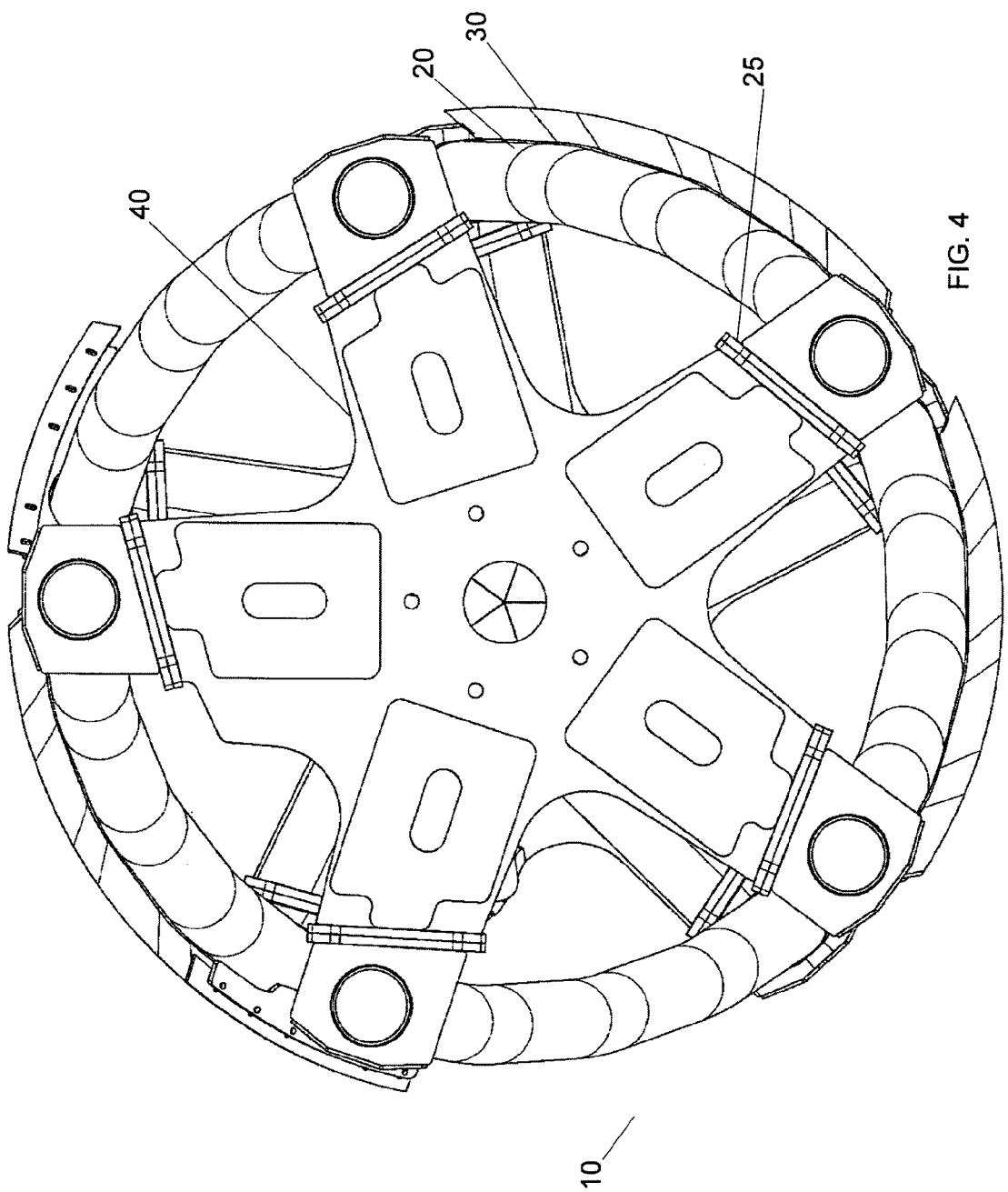
FIG. 4 is an axial view taken along one end of the reel depicted in FIG. 3.

Referring now to the drawings, wherein like reference numerals designate identical or corresponding parts throughout the several views.

Figure 14:
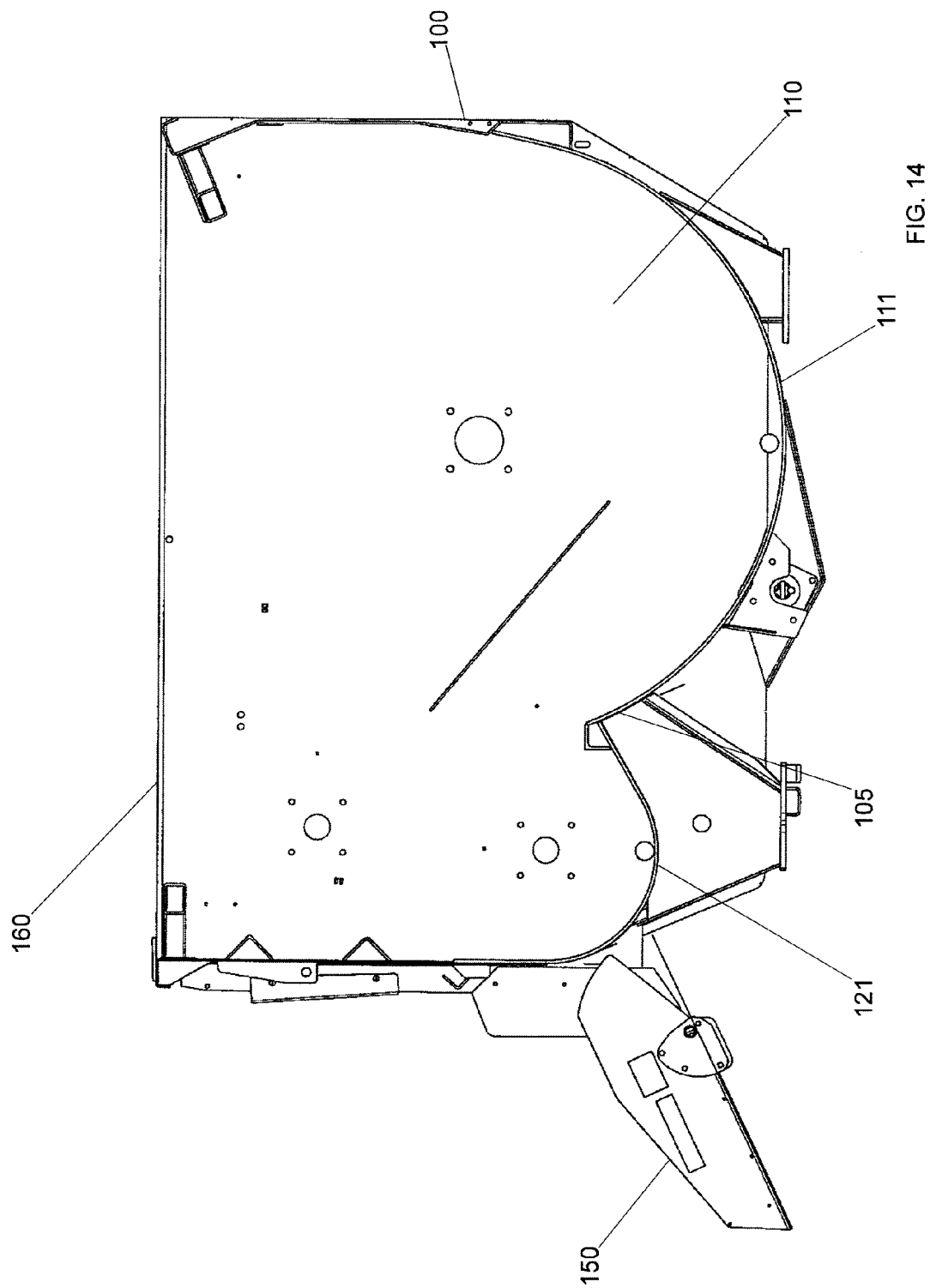
FIG. 14 is an end view with a cutaway of the mixing apparatus depicted in FIG. 13.
Figure 15:
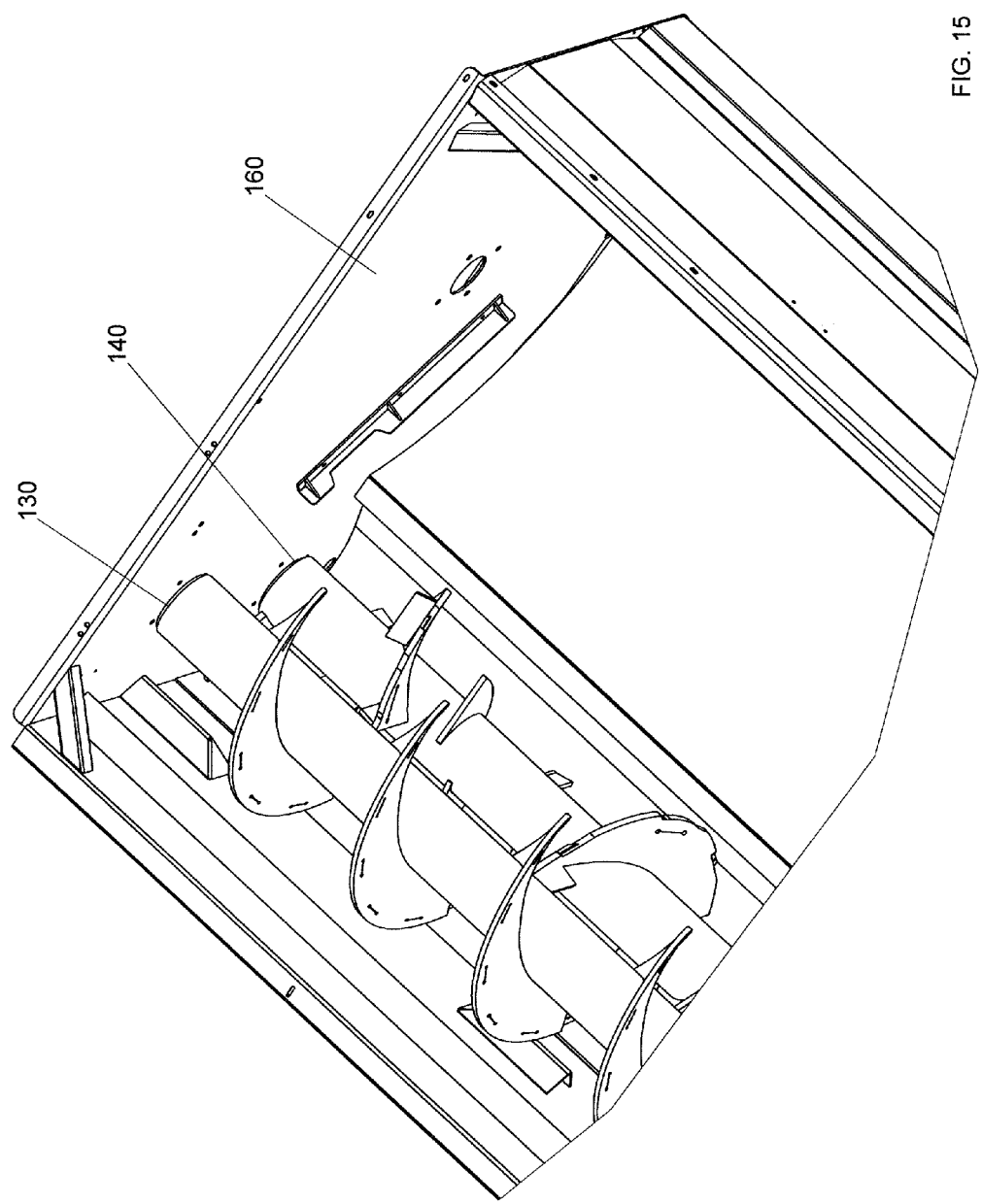
FIG. 15 is an isometric view of a portion of the mixing apparatus with the augers in place, but the reel removed.
Figure 16:
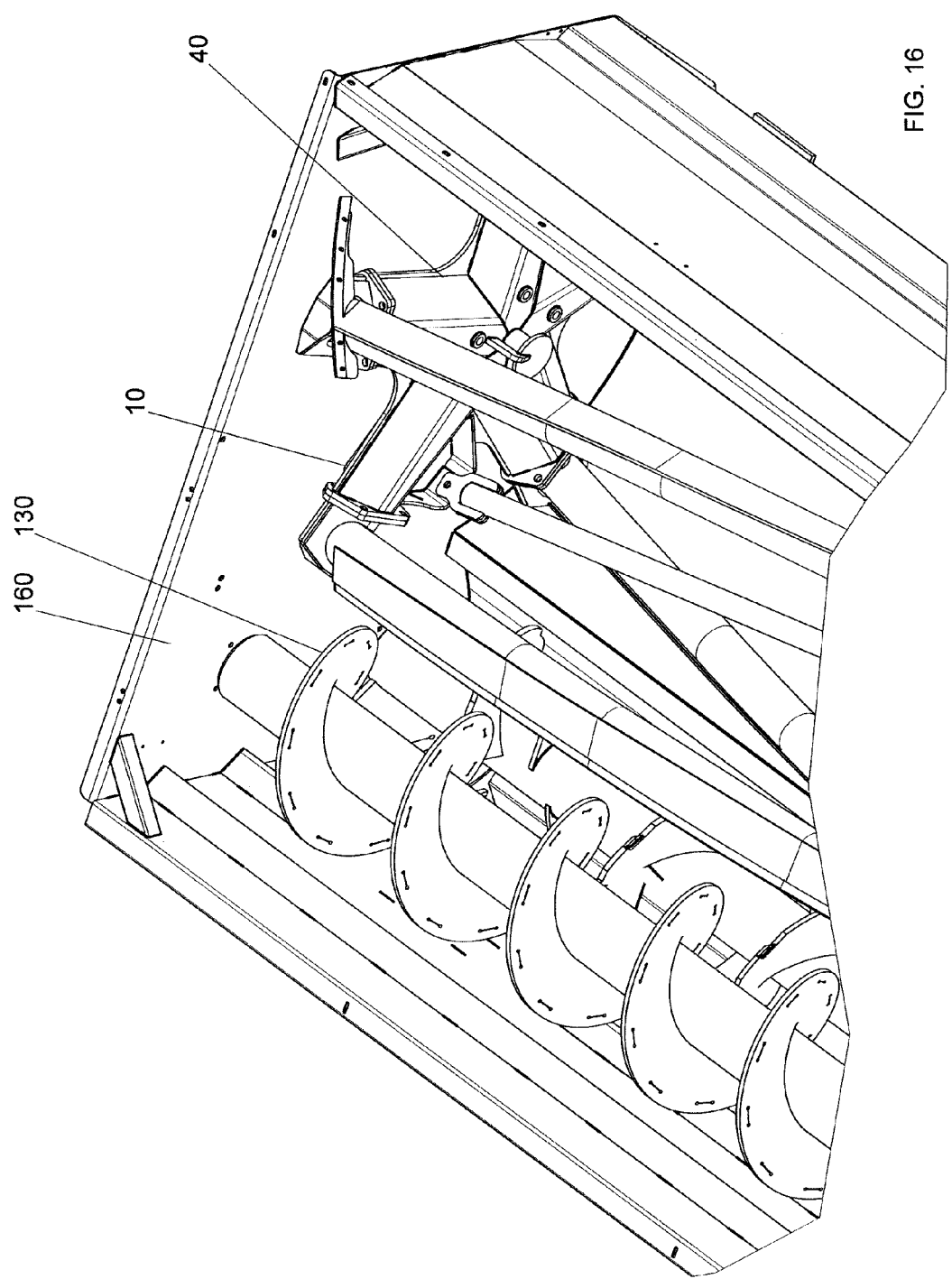
FIG. 16 is an isometric view of the apparatus depicted in FIG. 15 with the reel installed.
Figure 17:
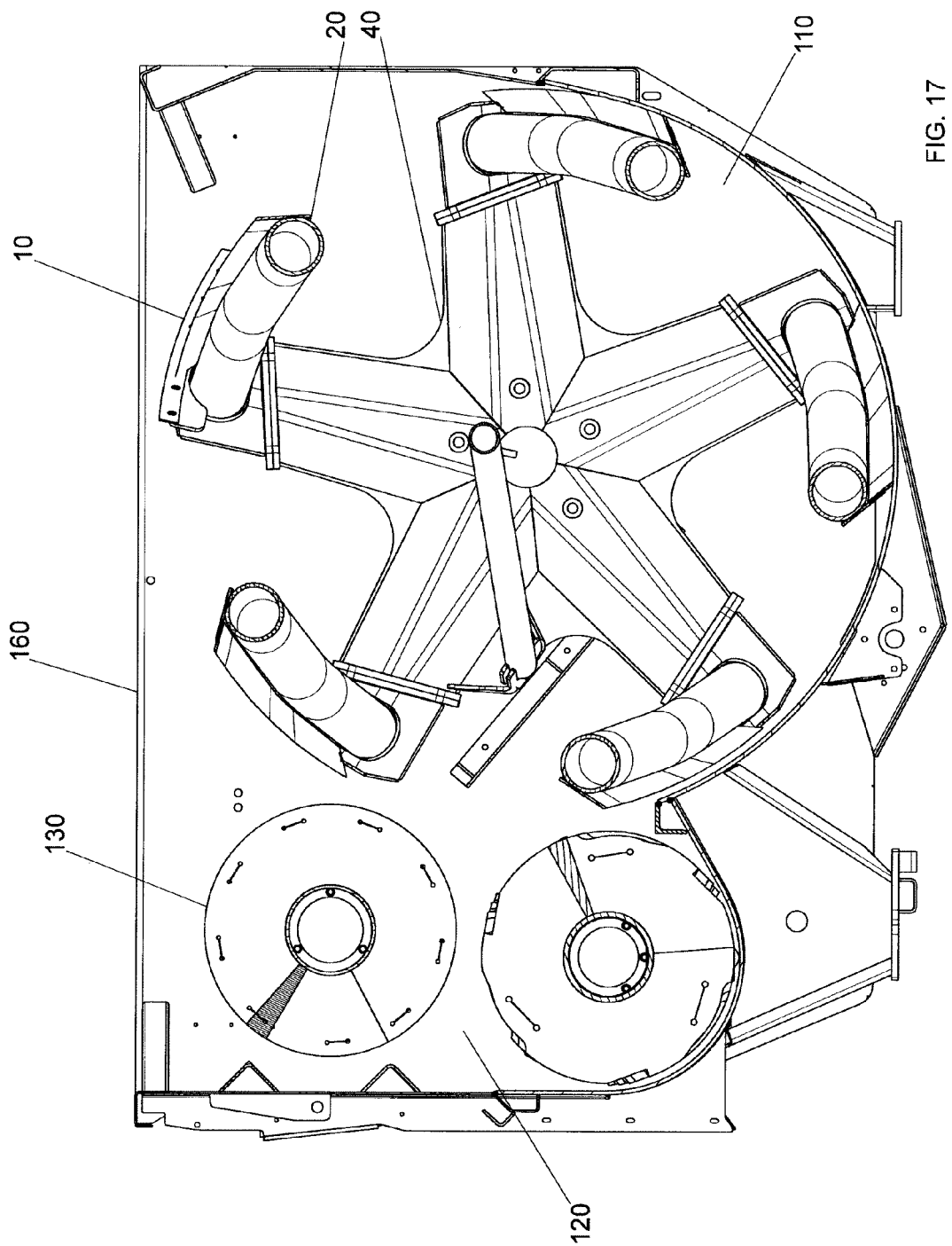
FIG. 17 is a cut-away end view of the apparatus depicted in FIG. 15 with the reel installed.

With reference to FIG. 1, one example of a reel 10 is depicted as an isometric view. The reel 10 includes at least one contoured bar 20 working as a connecting member that connects a first hub or star 40 to a second hub or star 50. The contoured bar 20 typically includes a wiper, for example, full wiper 30 along its edge. A full wiper typically extends along at least 90% of the axial length of the contoured bar 20, preferably along the entire axial length. The full wiper 30, or partial wiper in some cases, pushes mixing material along an interior surface of a hopper defining the boundary of a first chamber 110 (see FIG. 14). The reel 10 rotates within the first chamber 110 and lifts material upward and over a divider 105 and into an area for mixing via one or more augers 130, 140 (see FIGS. 15 and 17).

The contoured shape of the contoured bar 20 allows the contoured bar to remain a constant distance from a wall of the first chamber 110. Additionally, the contoured shape allows the first star 40 to be offset rotationally from the second star 50. In other words, as the contoured bar 20 extends from the first star 40 to the second star 50, the contoured bar follows a helical path. As shown in FIG. 1, the connection points of the ends of the contoured bars 20 are circumferentially offset such that ends are not directly across from each other, in the axial direction. A plurality of the contoured bars, for example five as shown in the example depicted in FIG. 1, forms the general shape of a helix when viewed together with the first and second stars 40, 50. One benefit of the above-noted arrangement is that, as the reel 10 rotates, feed or another mixing material will fall from the contoured bar 20 across the divider 105 gradually as the leading part of the contoured bar 20 passes by the critical angle of rotation that allows for the feed or other mixing material to release from the contoured bar 20. Thus, in contrast to providing a straight bar connecting, for example, a twelve o'clock position on a star synchronized with rotation with a twelve o'clock position on another star, the helical arrangement depicted in FIG. 1 allows a gradual release of material from the reel 10. This gradual release may ameliorate or eliminate "pulsing" inasmuch as the material leaving the contoured bar 20 leaves the contoured bar 20 over a longer period of time.

The contoured bar 20 can be used exclusively or in combination with straight bars connecting points of the first and second stars 40, 50. In one optional arrangement, an auxiliary stirrer 60, also referred to as an auxiliary member, connects one non-axial position on one of the stars 40, 50 with another non-axial position on another of the stars 40, 50. The contoured bars 20 can be understood to be primary members that connect the first and second stars, and the auxiliary stirrer 60 can be understood to a secondary member that, as shown in FIG. 1, passes through an interior portion of the helix defined by the contoured bars 20. The auxiliary stirrer 60 may disrupt any standing waves or patterns of rotation created by the reel 10, and therefore, provide higher mixing efficiency. In one embodiment, the auxiliary stirrer is a bar, similar or perhaps different in size from the contoured bars 20. In another embodiment, the auxiliary stirrer 60 is a chain. In yet another embodiment, the auxiliary stirrer 60 is a cable such as a steel cable, for example. The auxiliary stirrer 60 may connect one non-axial point on one star to another non-axial point on the opposite star. Additionally, in one embodiment, the auxiliary stirrer 60 may connect an axial point on one star with another non-axial point on another star. However, in order to prevent packing within the helix of the reel 10, it is preferred that no shaft or rigid member connect the axial points on each of the stars 40, 50 to each other. In other words, it is desirable to keep the interior of the reel 10 somewhat open, and therefore, a direct connection between the center points of the stars with a solid shaft, hollow pipe, frame work, or other such member is avoided in many of the embodiments of the reel 10. However, some configurations of the reel 10 provide one or more helical contoured bars 20 in combination with a center shaft or other such central member.

The auxiliary stirrer 60 acts to disrupt standing waves within the cylindrical area swept by the bars 20. In other words, the auxiliary stirrer passes through a cylindrical area swept by the bars 20 (which is typically hollow), and the auxiliary stirrer 60 breaks up or stirs material that otherwise might remain in this within this swept cylindrical area undisturbed the same way material within the eye of a hurricane might be undisturbed as long as it is within the eye.

As shown in FIGS. 1, 2, 3, and 4, the contoured bars 20 may include full wipers 30 extending along a majority of the length of the contoured bar 20. In this embodiment, each of the plurality of contoured bars 20 in combination with its associated full wiper 30 sweeps most or all of the interior of the first chamber as the reel rotates.

Figure 5:
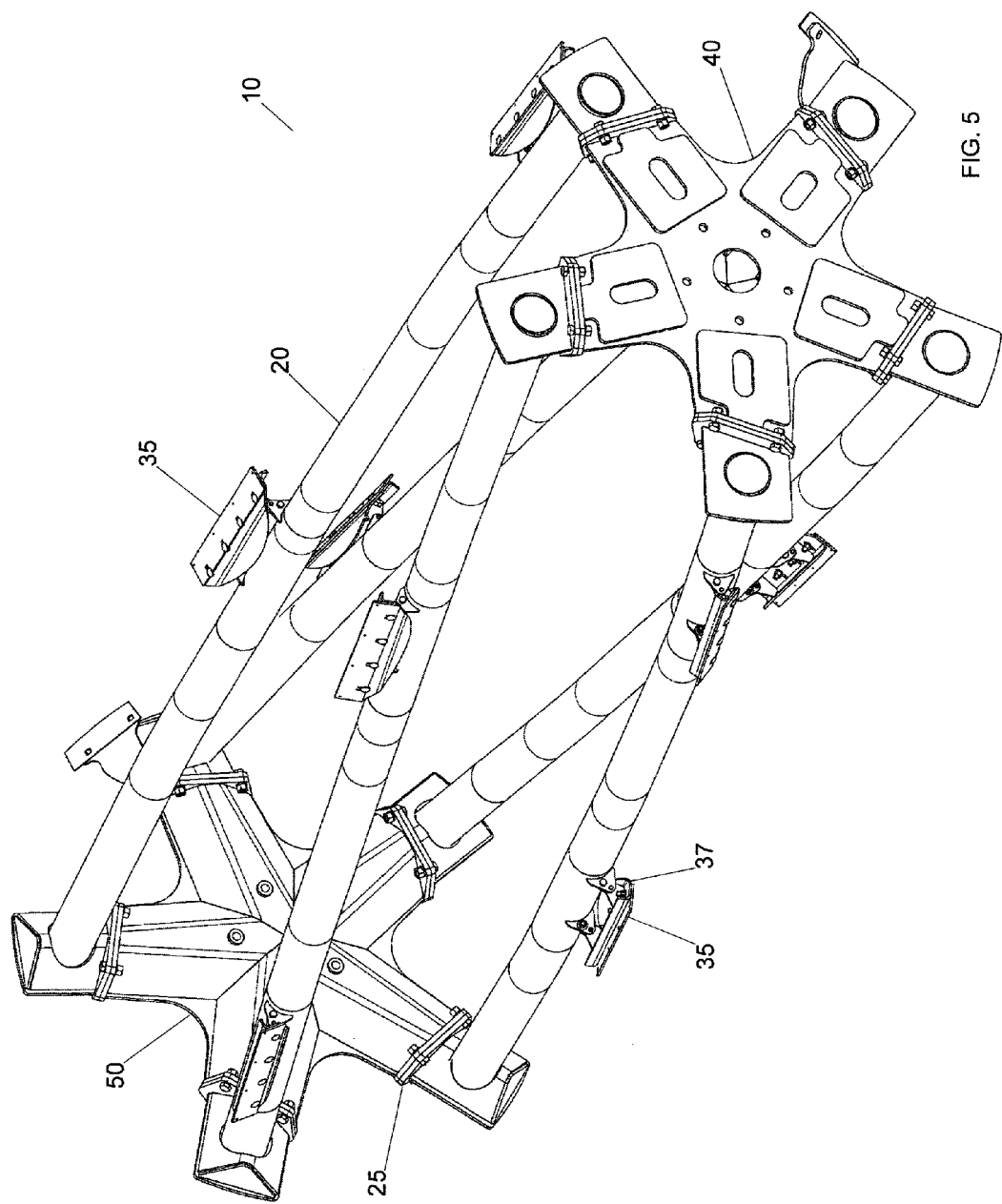
FIG. 5 is an isometric view of the reel using partial wipers.
Figure 6:
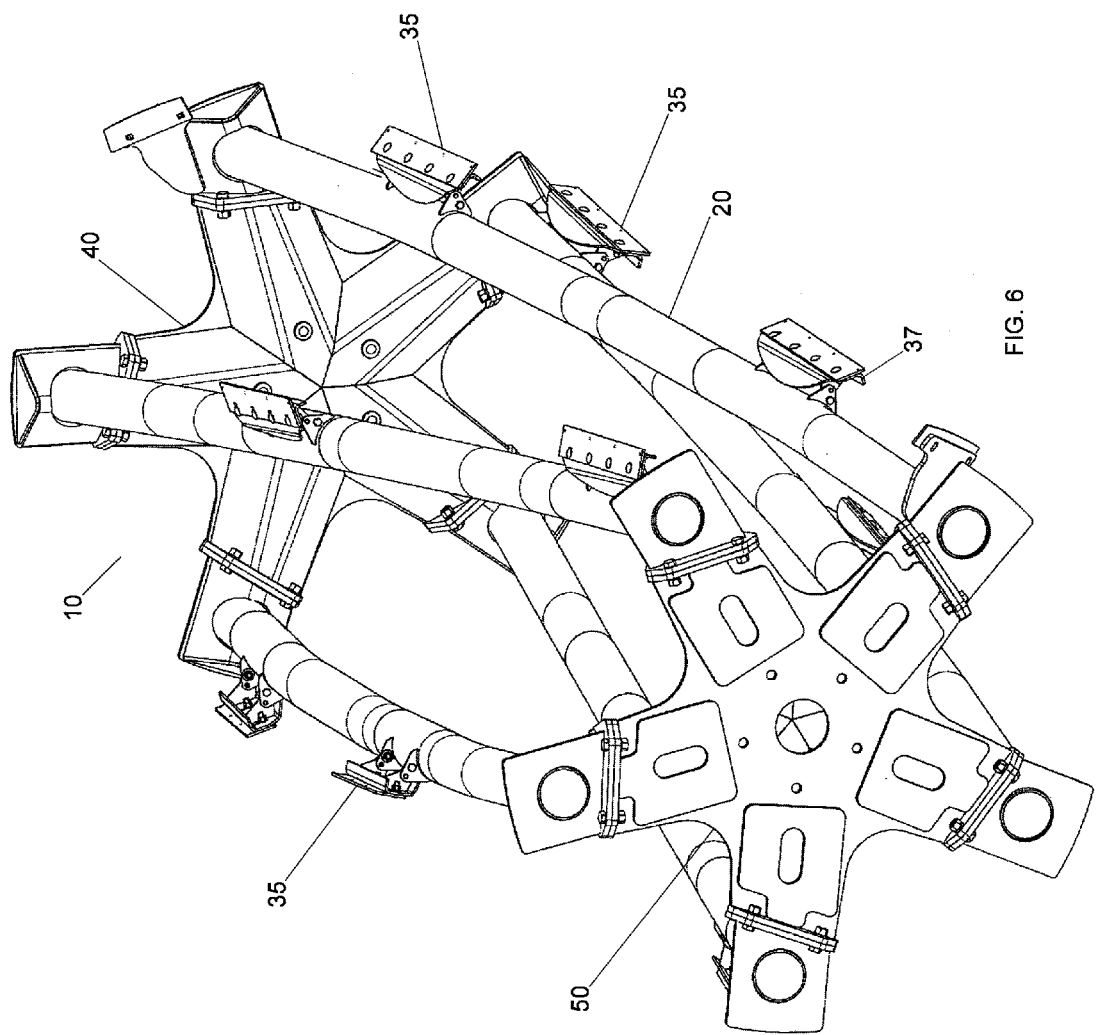
FIG. 6 is a second isometric view of the reel depicted in FIG. 5.
Figure 7:
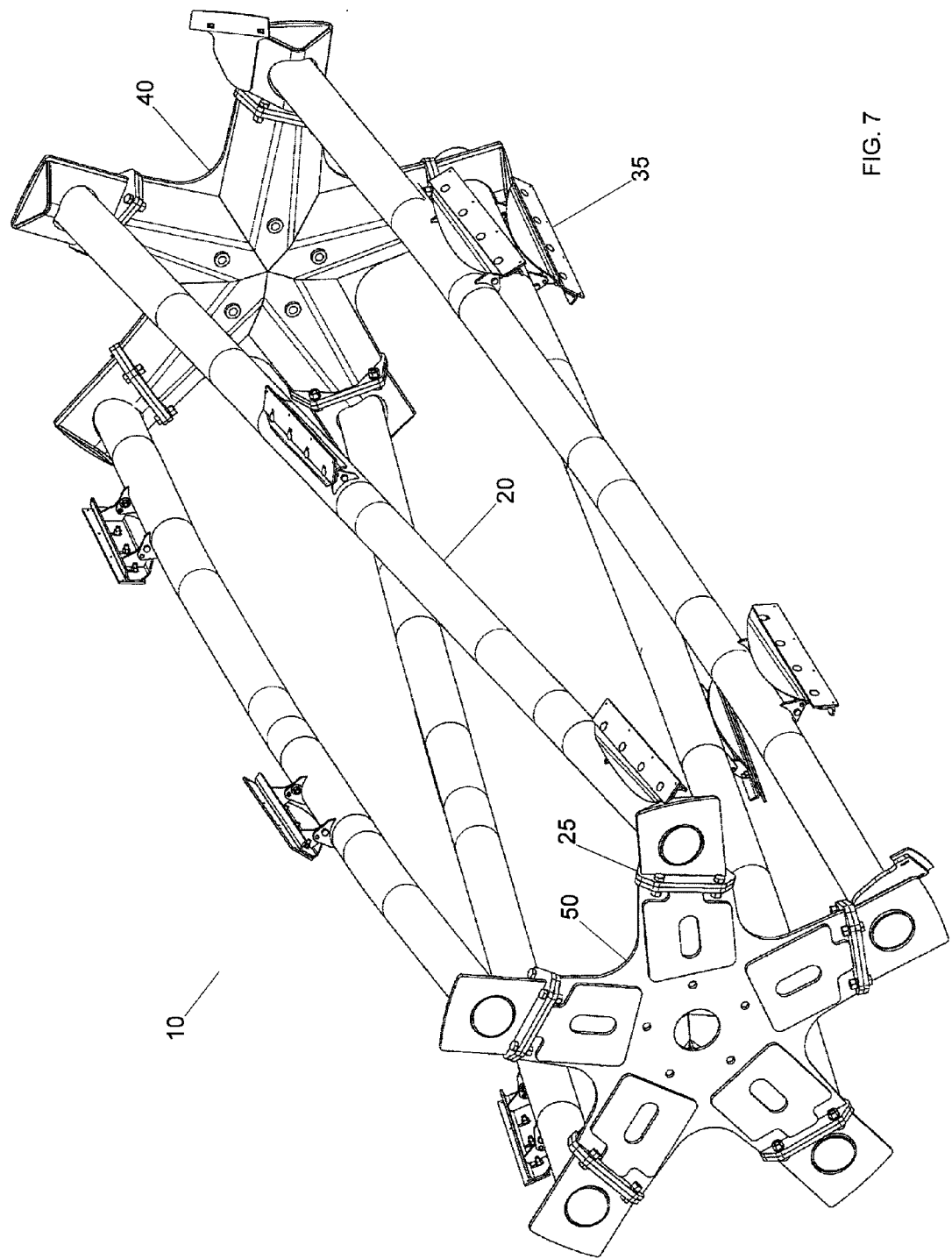
FIG. 7 is a third isometric view of the reel depicted in FIG. 5.
Figure 8:
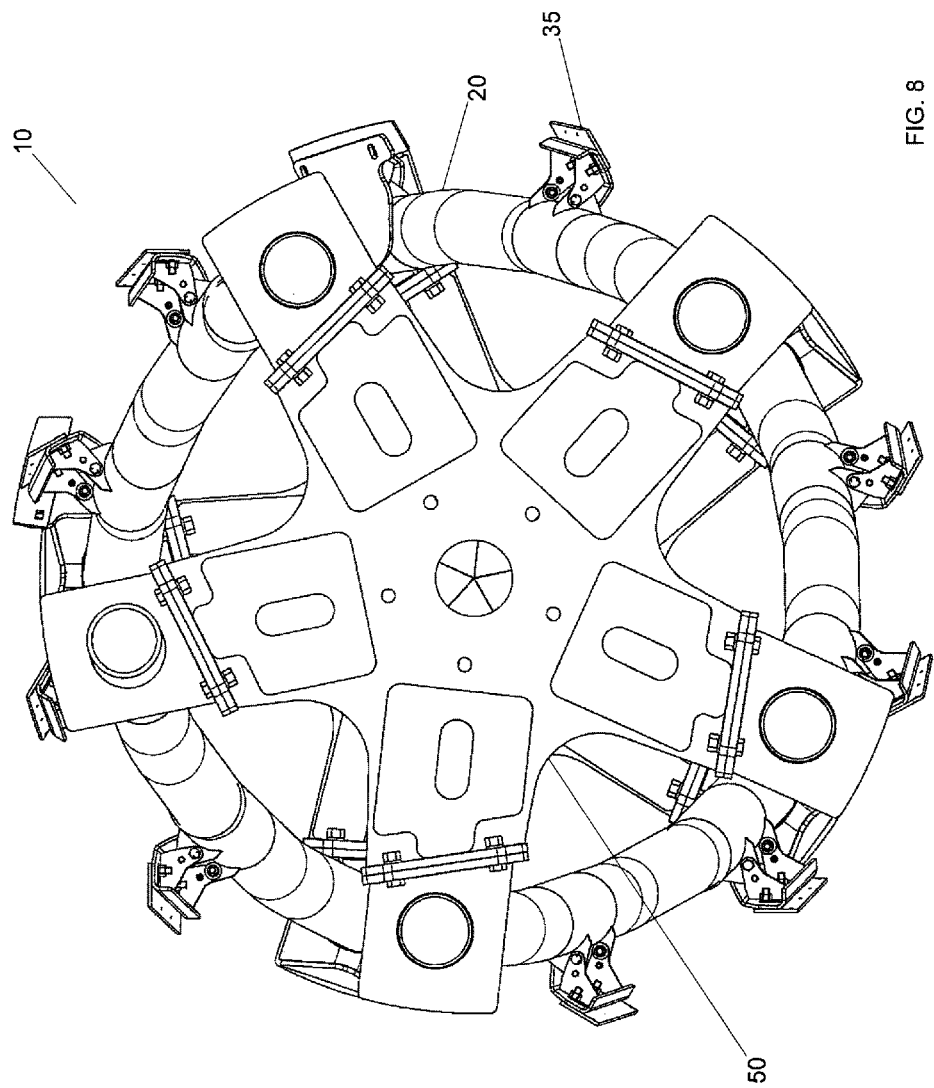
FIG. 8 is an axial view of the reel depicted in FIG. 5.
Figure 9:
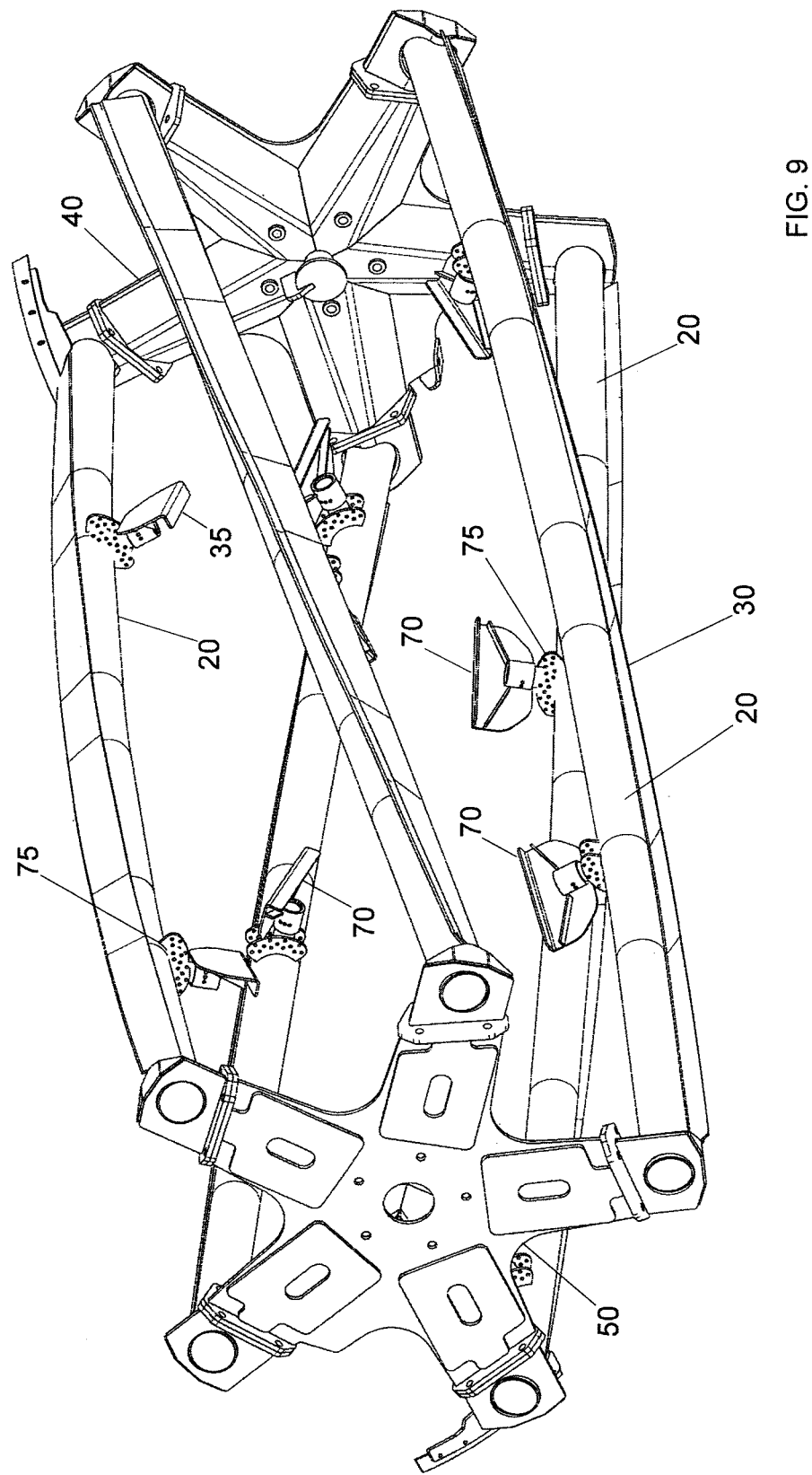
FIG. 9 is an isometric view of the reel including adjustable paddles.
Figure 10:
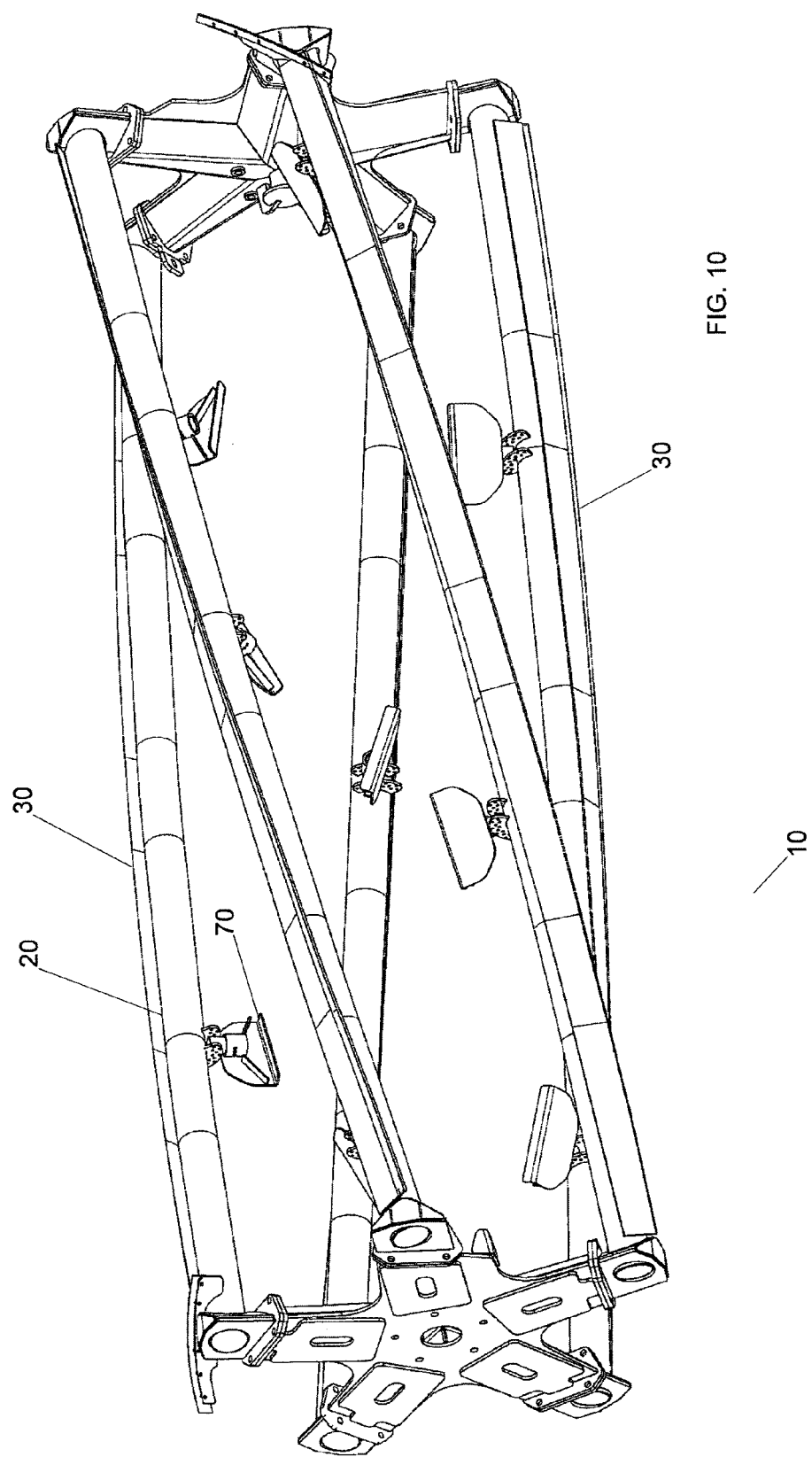
FIG. 10 is another view of the reel depicted in FIG. 9.
Figure 11:
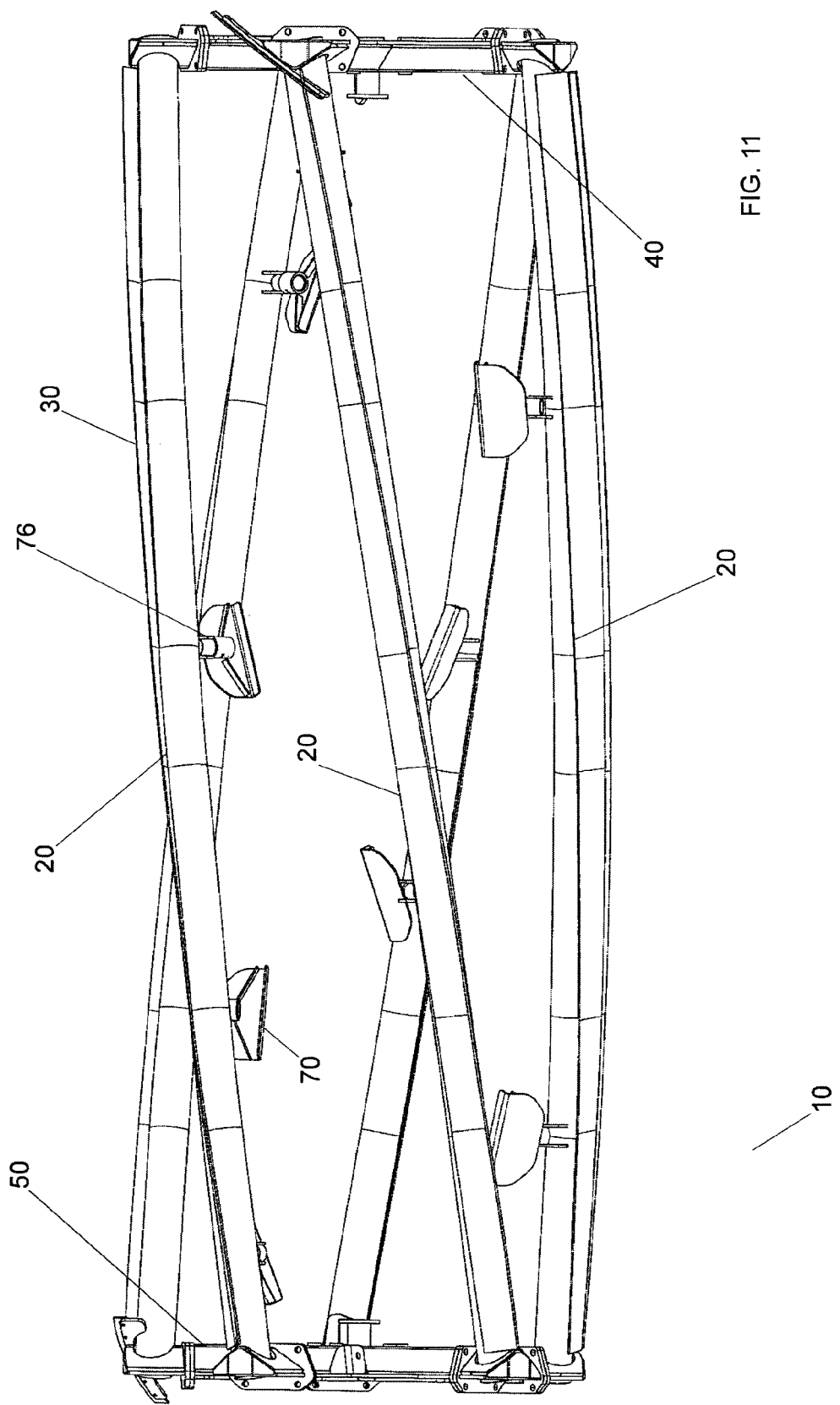
FIG. 11 is an alternate embodiment of the reel depicted in FIG. 9 with a different type of rotational unit for the paddles.
Figure 12:
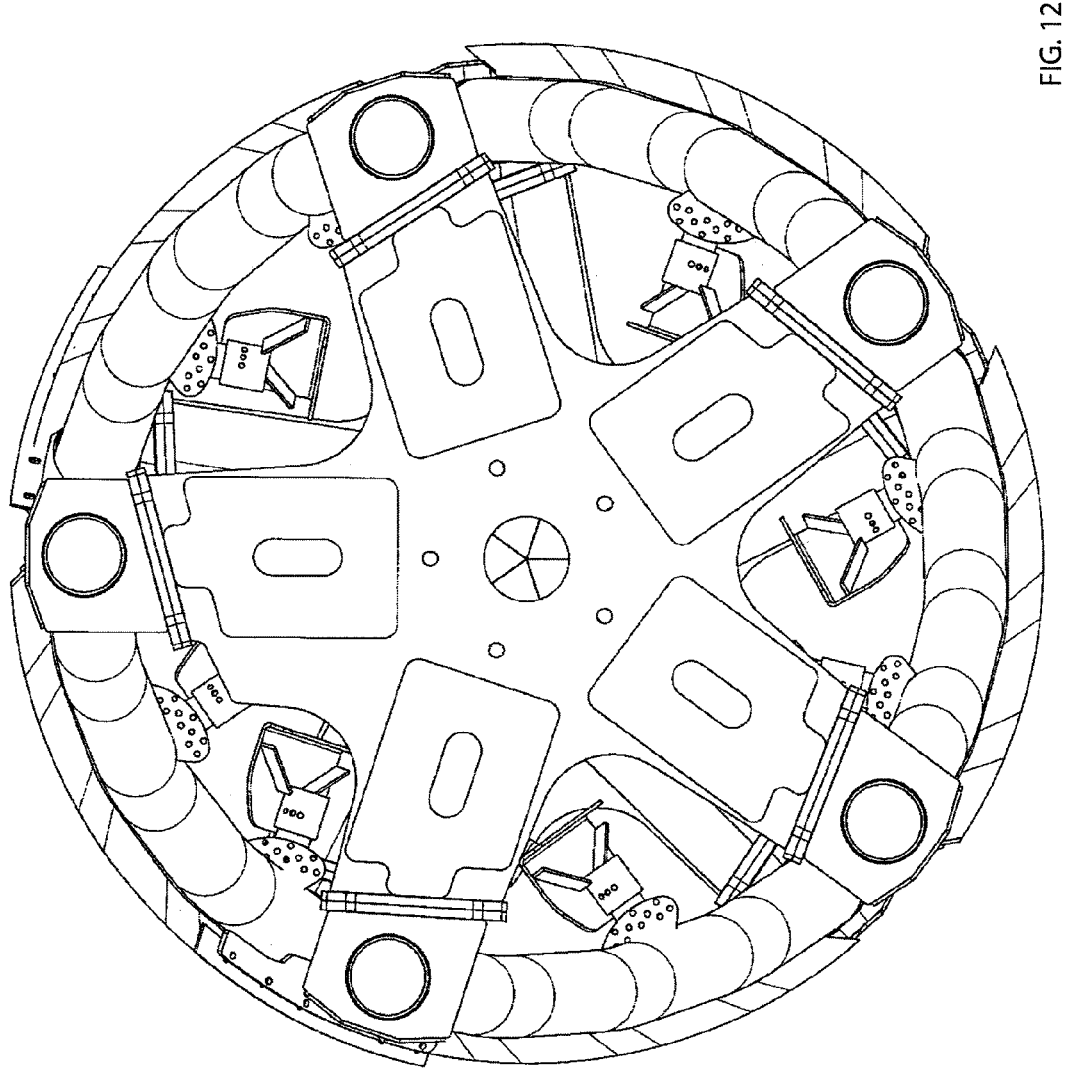
FIG. 12 is an end view of the arrangement depicted in FIG. 11.
Figure 13:
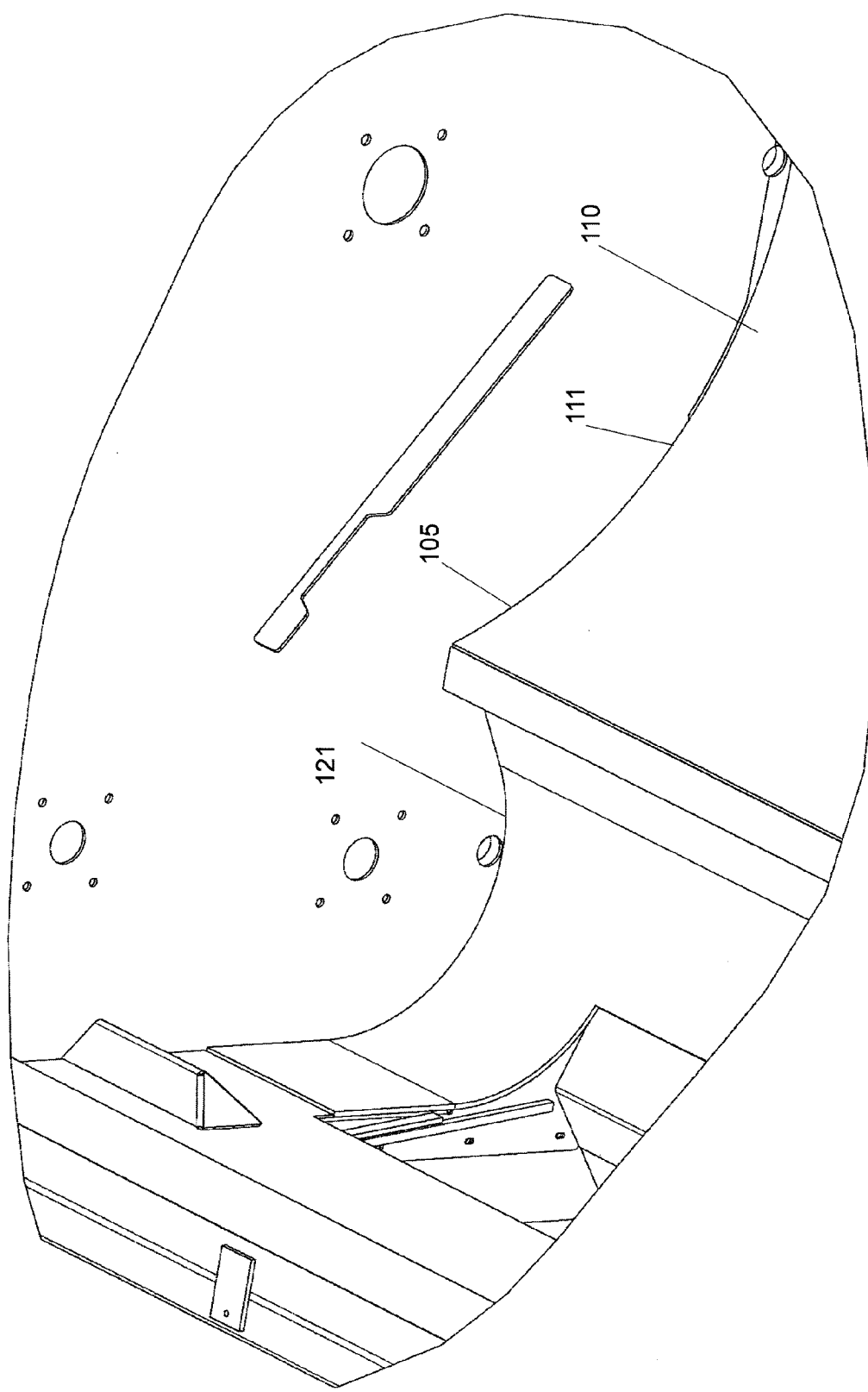
FIG. 13 depicts an isometric view of a portion of a mixing apparatus with a reel and pair of augers removed.

In another embodiment, shown in FIG. 5, the full wiper 30 is replaced with one or more partial wipers 35 on one or more of the contoured bars 20. A partial wiper 35 typically extends along no more than 10% of the axial length of the contoured bar 20 in order to provide increased randomness to the mixing. Although FIG. 5 depicts only partial wipers 35, some embodiments of the inventive reel 10 combine contoured bars 20 with straight bars and/or full wipers 30. In other words, the reel can include at least one straight bar, contoured bar 20, full wiper 30, and/or partial wiper 35. Additionally, the auxiliary stirrer 60 may be used with any of the above-noted arrangements. In one embodiment, the wipers 35 can be designed to move to relieve pressure caused by the mixed material. The wipers 35 can further be designed to move and remain in an adjusted position (not return to the normal mixing position). This design may use a shear type mounting bolt. In a further variation, the wipers 35 can move and return to the normal mixing position. This design may use a compression or torsion spring to return the wipers 35 to the normal mixing position.

Again referring to FIG. 1, the first and second stars 40 and 50 typically include some form of connection for the contoured bars 20. This connection may be by direct welding. Direct welding is typically the simplest method of connecting the contoured bars 20 to the stars 40, 50. However, in another embodiment, the contoured bars 20 are connected to the stars 40, 50 via mechanically coupled connections 25, which are typically screwed, clamped, or bolted connections. In this manner, the contoured bars 20 may be removed from the stars 40, 50 and replaced with different configurations or replaced when damaged, for example, in the event a rock is placed within the apparatus and damages the reel.

Similarly, the auxiliary stirrer 60 may be bolted to the stars or connected via some other detachable configuration. Likewise, as shown in FIG. 5, the partial wiper 35 may be connected to the contoured bar 20 via a wiper connection 37. In some regards, the wipers 30, 35 may be considered consumable devices inasmuch as they are sometimes made of semi-rigid or partially flexible materials such as plastic or rubber, although other materials such as steel may be used. Therefore, after long periods of rotation of the reel 10, the wipers 30, 35 will gradually wear away. Therefore, it is beneficial to provide a removable connection connecting the full wiper 30 or the partial wiper 35 to the contoured bar 20. Typically, this connection between the contoured bar 20 and the wiper 30 or 35 will be via bolted clamp or direct bolting or screwing.

Depending on the needs of the user, the distance of the contoured bars 20 from the walls of the first chamber 10 may be varied. For example, in one application, it may be desirable to have a minimal or small clearance between the contoured bar 20 and the wall of the chamber, for example, one inch or less. The wiper 30, 35 will typically close the gap between the contoured bar 20 and wall of the first chamber in order to brush against the wall during rotation. In some embodiments, the distance from the contoured bar 20 to the wall of the first chamber 110 varies along the axial length of the contoured bar 20. In other words, at one end of the contoured bar 20, the gap may be, for example, one inch; and at the other end of the contoured bar 20, the gap may be three inches. Variations in the size of the full wiper 30 and/or partial wipers 35 may be used to make up the gap. In other words, the wiper may compensate for the change in distance between the bar 20 and wall. In other embodiments, the gap between the contoured bar 20 and the wall of the first chamber 110 remains the same along the axial length of the contoured bar 20.

In some embodiments of the reel 10, the coupled connection 25 may be used to replace the contoured bar 20 with a contoured bar 20 of a larger diameter, thus reducing the distance between the wall of the first chamber 110 and the surface of the contoured bar 20. An alternate or supplemental way of altering the distance (gap) between the contoured bar 20 and the wall of the first chamber 110 is to change a connection point of the contoured bar 20 to the first or second stars 40, 50. In other words, the center of the contoured bar 20 is positioned, radially, nearer or farther from the center of the star 40, 50. The Applicants have found that changing the position of the contoured bars 20 in the radial direction or by changing the diameter of the contoured bars 20 alters the amount of horsepower required to rotate the reel. Unexpectedly, it appears that the maximum amount of horsepower required to rotate the reel through agricultural material is typically not required when the contoured bars 20 are positioned at the outermost radial position. Rather, the maximum horsepower is required for rotation of the reel 10 when the contoured bars 20 are positioned somewhat inward of the outermost radial position.

Regarding the wipers 30, 35, it is preferred that the entire axial length of the reel 10 is wiped via one or a plurality of the wipers in combination. In other words, while it is not necessary for every wiper or even for one wiper to wipe the entire length of the reel 10, some combination of the partial or full wipers should typically pass across the bottom of the chamber 110 at some point along every part or nearly every part of the axial length of the bottom of the chamber 110.

Typically, the reel 10 will rotate such that the top part of the reel 10 moves in a direction away from the top of the upper auger 130. Additionally, the reel 10 typically rotates at a speed of approximately 1 to 12 rpm, preferably, approximately 6 rpm. In a preferred embodiment, no connecting structure connects the centers of the hubs 40, 50, and therefore, material can flow freely within the helix of the reel 10, and a solid "barrel-like" compaction of the mixing material within the reel 10 may be prevented. Thus, a complete or partial free space extends from at least one of the hubs 40,50 toward the other of the hubs. In some embodiments, a slight amount of axial movement of the feed is created by the helical shape of the reel 10.

In operation, the reel 10 pushes material over the divider 105 toward the upper and lower augers 130, 140. The lower auger, during rotation, pushes the material toward a chute 150 (see FIG. 14). The bottoms of the first and second chambers 110, 120 are curved bottoms 111, 121, in order to accommodate the rotational movement of the reel 10 and lower auger 140.

One or both of the stars 40, 50 may be driven via a motor and/or gear system. For example, a hydraulic or electric motor may be connected to the driven star directly or via a belt/chain and pulley arrangement. Additionally, the mixer 100 shown in FIG. 14 may be connected to a truck, pulled behind a trailer, or set up as a stationary configuration. Feed or other mixing material will be typically added to the mixer 100 via an open top 160.

Obviously, numerous modifications and variations of the present invention are possible in light of the above teachings. Thus, the reel and or mixing system may be used with or without a central shaft used to drive the hubs, but it is preferable to omit the central shaft or other such connecting structure in order to allow increased mixing effect. Additionally, while both straight and/or contoured bars may be used to connect the two hubs/stars, it is preferable that at least one contoured bar is used for connection. Any combination of the above-noted embodiments may be used. It is therefore to be understood that within the scope of the appended claims, the invention may be practiced otherwise than as specifically described herein.

The invention claimed is:

1. A mixing apparatus comprising:
a hopper defining first and second chambers, the first chamber disposed adjacent to the second chamber;
a reel disposed within the first chamber, the reel including first and second hubs configured to rotate and at least one connecting member connecting the first hub to the second hub; and
at least one auger disposed in the second chamber,
wherein the connecting member is tubular,
wherein each of the first and second hubs includes a central portion, and at least one of the central portion of the first hub or the central portion of the second hub being connected to be driven,
wherein the first and second hubs rotate about a common axis of rotation, and no connecting member connects a center of the first hub to a center of the second hub along the axis of rotation, and
wherein an attachment point between each connecting member and the first hub is circumferentially offset with respect to an attachment point between the same connecting member and the second hub.

2. The mixing apparatus of claim 1, wherein a free space extends between the center of the first hub and the center of the second hub.

3. The mixing apparatus of claim 1, wherein an auxiliary member extends from the first hub to the second hub, and the auxiliary member is attached to one of the first hub and the second hub at a point that is not on the center of the one of the first hub and the second hub.

4. The mixing apparatus of claim 1, wherein the at least one connecting member extending from the first hub to the second hub follows a non-linear path as it extends from the first hub to the second hub.

5. The mixing apparatus of claim 1, wherein the at least one connecting member is straight and a distance between the connecting member and chamber wall varies along the length of the chamber.

6. The mixing apparatus of claim 1, wherein the distance between the connecting member and chamber wall remains substantially constant along the length of the chamber.

7. The mixing apparatus of claim 1, wherein the at least one connecting member extending from the first hub to the second hub has a helical shape.

8. The mixing apparatus of claim 1, further comprising at least one wiping member attached to the at least one of the connecting member.

9. The mixing apparatus of claim 8, wherein the at least one wiping member extends over the entire length of the connecting member to which the at least one wiping member is attached.

10. The mixing apparatus of claim 8, wherein the at least one wiping member extends over only a portion of the length of the connecting member to which the at least one wiping member is attached.

11. The mixing apparatus of claim 10, wherein the at least one wiping member is arranged in segments over the length of the connecting member to which the at least one wiping member is attached.

12. The mixing apparatus of claim 11, wherein the at least one connecting member includes a plurality of connecting members, and wherein wiper segments are arranged over the plurality of connecting members with segments being staggered with respect to each other in order to wipe a full length of first chamber.

13. The mixing apparatus of claim 1, wherein one of the hubs is driven, and the at least one connecting member maintains a fixed orientation of the first hub with respect to the second hub.

14. The mixing apparatus of claim 1, wherein a gap is disposed between the connecting members and a wall of the first chamber.

15. The mixing apparatus of claim 14, wherein a distance between the connecting members and a wall of the first chamber is adjustable.

16. The mixing apparatus of claim 1, wherein paddles with wipers are attached to the at least one connecting member.

17. The mixing apparatus of claim 1, wherein the first hub, second hub, and at least one connecting member are detachable from each other.

18. The mixing apparatus of claim 1, wherein the first and second hubs are positioned at first and second ends of the mixing chamber, respectively.

19. The mixing apparatus of claim 1, further comprising a paddle positioned within a cylindrical volume swept by the at least one connecting member to stir the material inside the reel.

20. A mixing apparatus comprising:
a hopper defining first and second chambers, the first chamber disposed adjacent to the second chamber;
a reel disposed within the first chamber, the reel including first and second hubs configured to rotate about a common axis of rotation;
at least one primary member connecting the first hub to the second hub and configured to sweep a cylindrical volume in an axial direction while the first and second hubs rotate;
at least one auger disposed in the second chamber; and
at least one secondary member disposed at a non-zero angle relative to the axis of rotation of the first and second hubs such that the secondary member passes through said cylindrical volume while the first and second hubs rotate,
wherein the primary member is tubular, and
wherein each of the first and second hubs includes a central portion, and at least one of the central portion of the first hub or the central portion of the second hub being connected to be driven.

21. The mixing apparatus of claim 20, wherein the at least one secondary member comprises a rigid tube.

22. The mixing apparatus of claim 20, wherein the at least one secondary member comprises at least one of a chain or cable in tension with a first end connected to the first hub and a second end connected to the second hub.

23. The mixing apparatus of claim 20, wherein the at least one secondary member is detachable from the first and second hubs.

24. A mixing apparatus comprising:
a hopper defining first and second chambers, the first chamber disposed adjacent to the second chamber;
a reel disposed within the first chamber, the reel including first and second hubs configured to rotate and at least one connecting member connecting the first hub to the second hub, the first and second hubs being configured to rotate about a common axis of rotation, and no connecting member connects a center of the first hub to a center of the second hub along the axis of rotation;
at least one wiper connected to the at least one connecting member, each wiper being connected to only one connecting member; and
at least one auger disposed in the second chamber,
wherein the connecting member is tubular, and
wherein each of the first and second hubs includes a central portion, and at least one of the central portion of the first hub or the central portion of the second hub being connected to be driven.

25. The mixing apparatus of claim 1, wherein the connecting member is bent.

26. The mixing apparatus of claim 25, wherein the connecting member is bent in substantially only one direction.

27. The mixing apparatus of claim 1, wherein the connecting member is round.

* * * * *